Patented Nov. 4, 1924.

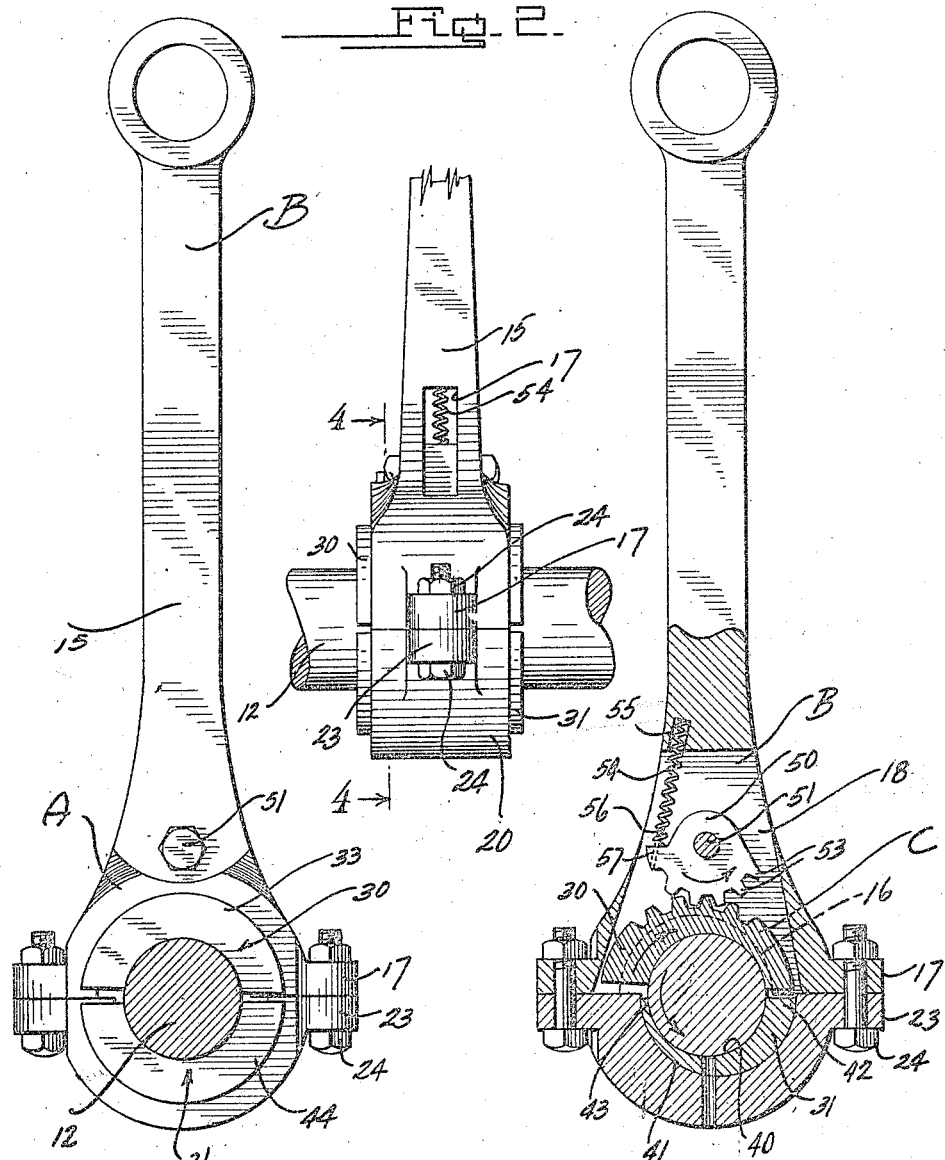

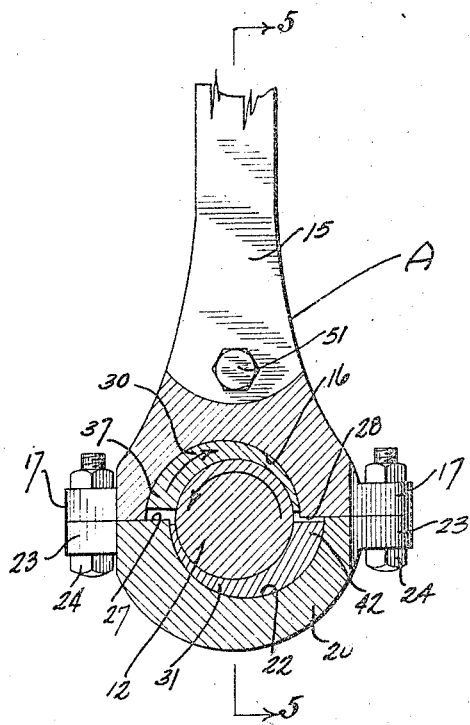
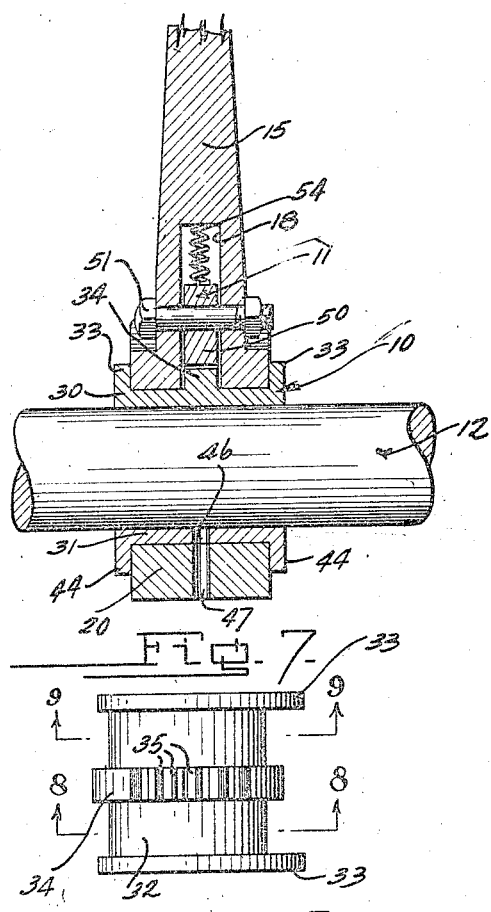
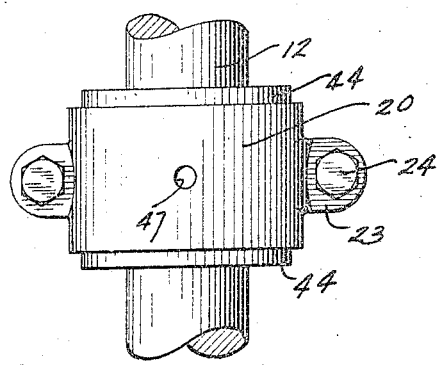

1,514,121

UNITED STATES PATENT OFFICE.

JOHN A. ANDERSON, OF BALATON, MINNESOTA, ASSIGNOR OF ONE-HALF TO FRED W. ANDERSON, OF BALATON, MINNESOTA.

ADJUSTABLE BEARING-BOX CONSTRUCTION.

Application filed June 21, 1922. Serial No. 569,788.

*To all whom it may concern:*

Be it known that I, JOHN A. ANDERSON, a citizen of the United States, residing at Balaton, in the county of Lyon and State of Minnesota, have invented certain new and useful Improvements in Adjustable Bearing-Box Constructions, of which the following is a specification.

This invention relates to improvements in adjustable bearing arrangements for supporting shafts, spindles and the like, which will effectively compensate for wear upon the bearing arrangement and shaft.

The primary object of the invention is the provision of a bearing construction, including means for automatic adjustment of the same for snugly receiving a shaft part, so that the shaft part may be accommodated thereby, against liability of slapping or loose bearing therein.

A further object of the invention is the provision of a bearing construction, particularly well adapted for use upon connecting rods, whereby the crank portion of a crank shaft may be gripped in snug manner, at all times; including an arrangement for compensation of wear upon the bearing construction and crank shaft incident to frictional engagement.

Other objects and advantages will be apparent during the course of the following detailed description.

In the accompanying drawings, forming a part of this specification, and wherein similar reference characters designate corresponding parts throughout the several views, Figure 1 is a side elevation of a connecting rod of an engine, in which the improved bearing construction forms a part.

Figure 2 is a side elevation of the improved bearing construction as embodied in a connecting rod, showing the same supporting a shaft.

Figure 3 is a cross sectional view, taken longitudinally of the lower portion of a connecting rod, and showing the improved bearing construction as used in connection therewith for the support of a shaft.

Figure 4 is a cross sectional view, taken on the line 4—4 of Figure 2.

Figure 5 is a cross sectional view, taken on the line 5—5 of Figure 4.

Figure 6 is a bottom plan view of the bearing construction.

Figure 7 is a plan view of an element of the improved bearing construction.

Figure 8 is a traverse cross sectional view, taken on the line 8—8 of Figure 7.

Figure 9 is a transverse cross sectional view, taken on the line 9—9 of Figure 7.

In the drawings, wherein for the purpose of illustration is shown the preferred embodiment of this invention, the letter A designates the improved bearing construction, which includes a housing B and adjusting mechanism C. The adjusting mechanism C preferably comprises a box 10 and means 11 working in cooperation with said box 10 for adjusting the latter to properly journal a shaft member 12 therein.

The housing B, as illustrated in the drawings, is a connecting rod, including the stem portion 15, which is provided with the semi-cylindrical recess 16, formed inwardly upon one end thereof and having the lateral attaching ears 17 formed outwardly thereon. A pocket 18 is provided, extending inwardly and longitudinally of the stem portion 15 of the connecting rod B, and which is formed inwardly of the recess 16. A cap 20 is provided for use upon the enlarged end of the connecting rod stem 15, which simulates somewhat the ordinary connecting rod cap and is provided with the bore or depression 22, which is of semi-cylindrical formation. Attaching ears 23 are provided upon the cap 20 extending laterally thereof and adapted for cooperation with the attaching ears 17 for receiving the clamping bolts 24. As can readily be seen from the drawings, when the bolts 24 are in position to clamp the cap 20 upon the stem portion 15 to form the connecting rod B, the depressions 16 and 22 are in facing relation. While these depressions are preferably struck from radii which are of the same dimension, it is a feature of this invention that when the connecting rod or housing B is so assembled, that the said depressions 16 and 22 will be eccentrically disposed to provide shoulder portions 27 and 28, of the cap and stem portions 20 and 15 respectively, which face the depressions 16 and 22 respectively. In other words, when the connecting rod is so assembled, the shoulders 27 and 28 extend into the bore or opening provided therein for receiving the box 10 of the adjusting mechanism C and in a manner which will be subsequently described in detail.

Referring now to the adjusting mechanism C, the box 10 thereof is formed of any approved material, such as babbitt, and adapted for receiving the shaft or spindle member 12, for the same purpose that the ordinary bearing box is provided. This box 10, however, is formed of sections 30 and 31, which are adapted for working in the pockets 16 and 22 of the housing portions 15 and 20 respectively. The section 30 is of concavo-convex formation, being arcuated in wedge shaped manner, and having the outer arcuate or convex surface 32 thereof provided with the side flange extensions 33. The outer surface 32 is also provided with a rib 34, midway of the flanges 33; said rib 34 being provided with a plurality of teeth 35 thereon, adapted for coaction with the means 11, which will be subsequently described. The inner surface 36 of the segment 30 is struck from a center, which is eccentrically disposed with respect to the center from which the outer surface 32 is struck, so that the section 30 is wedge shaped, having an enlarged end 37, from which the thickness of the section 30 gradually diminished to the end 38, where the section 30 is of least thickness. The section 31 is of concavo-convex formation, and having the concaved and convex surfaces 40 and 41 thereof struck in eccentric manner, whereby said section 31 is of wedge shaped formation, and in which the end 42 is of greatest thickness and gradually diminishes in thickness toward the end 43, where said section is of least thickness. The side flanges 44, are altogether similar to the flanges 33 above described for that of section 30, are formed upon this section 31.

In assemblage, the surface 41 of the section 31 is disposed in abutting manner upon the inside surface of the cap depression 22, so that the enlarged end 42 of said section 31 is disposed against the shoulder 28 of the connecting rod stem 15. On the other hand, the section 30 is so disposed in the depression 16 above described, that the toothed rib 34 is disposed upwardly in the pocket 18, and the enlarged end 37 of said section 30 is disposed adjacent and facing the shoulder 27. When in this position, concaved surfaces 36 and 40 of the sections 30 and 31 respectively, are in facing relation and provide a circular opening for reception of the shaft member 12. The flanges 33 and 44 of said sections 30 and 31 respectively, are in sliding contact with the side surfaces of the stem and cap portions of the connecting rod B, and the sections thus prevented from lateral displacement from the same.

For lubricating purposes, apertures 46 and 47 are provided transversely through the section 31 and the cap portion 20 of the connecting rod, so that they may be aligned when positioned for receiving the shaft portion 12 for lubricating the inside surfaces of the bearing box sections.

The means 11 for regulating the opening effected by the box 10 is entirely disposed within the pocket 18 of the connecting rod stem 15, and includes a pawl member 50, detachably pivoted in the pocket 18 as by a bolt 51, which extends transversely through the stem 15; said pawl 50 including a plurality of teeth 53 in segmental formation, for meshing relation with the teeth 35 of the box section 30. A spiral spring 54, normally under compression, is seated at one end within a pocket depression 55 formed in the stem 15 and at its other end is disposed over a pin 56, which is mounted on an extension 57 of the pawl 50, so that said pawl member 50 is normally forced by the spring 54 in one direction as indicated by the arrow in Figure 3 of the drawings.

In operation, the box 10 will be assembled in the housing B as above described. The crank portion 12 of a crank shaft, spindle or other shaft device will then be disposed within the circular opening formed by the box sections 30 and 31 above described. As the spring action upon the pawl 60 is such as to force the reduced end 38 of the top box section 30 toward the enlarged end 42 of the lower section 30 it can be seen that due to the wedge shaped formation of the sections 30 and 31, the opening formed by the facing depressions therein will tend to normally be reduced, so that the shaft 12 is snugly gripped between said box sections. It is to be noted that the direction of rotation of the shaft 12 is directly counter to the direction in which the box section 30 is moved. This counter action of the shaft member 12 will have a tendency to slide the box sections 30 and 31 so that the shaft loosely bears within said box 10, notwithstanding the action of the yieldable means 12 thereon. As the abutting surfaces of the shaft member 12 and the box device 10 become worn and reduced, the adjusting means 11 will force the section 30 circumferentially about the shaft 12 and intermediate the same and the pocket 16 provided in the housing B, so that notwithstanding the wear upon said parts the shaft member B will, at all times snugly bear in the box arrangement 10, to prevent a loose bearing and "slapping" of the shaft 12 during rotation thereof. Due to sudden jerking of the shaft member 12, as during starting thereof and during excessive speed, the enlarged ends 37 and 42 cooperate against the shoulders 27 and 28 respectively, to prevent injury to the bearing box 10. The spring 54 is, of course, of sufficient compressive force to hold the box arrangement 10 in snug bearing relation to the shaft part 12, at all times, during normal rotation of said shaft. The yieldable means 12 not only acts upon the section 30, but as the box and shaft surfaces become worn, the spring 54 will force the segments or sections 30 circumferentially in the pocket 16, so that the reduced end 38 thereof may ride outwardly of the shoulder 28, to come into contact with the enlarged end 42 of the other box section 31, and start rotation of said box section 31 for taking up wear upon the box and shaft member by reduction of the opening formed by the facing surfaces 36 and 40.

From the foregoing, it can be seen that an automatically adjustable bearing has been provided, which is of compact formation, and which has no part thereof extending so that the same might be injured as by knocking thereagainst. All parts of the improved device are detachable and readily accessible, so that the improved bearing construction is particularly well adapted for use in connection with the connecting rods of crank shafts although the use of the bearing construction is not to be so limited.

Various changes in the shape, size and arrangement of parts, may be made to the form of the invention herein shown and described, without departing from the spirit of the invention or the scope of the claim.

I claim:

In a bearing construction, a body having a main section and an auxiliary cap forming section, said sections being provided with off-set recesses forming a shaft receiving bore having at opposite sides abutment shoulders facing in opposite directions, bushing members in said recesses tapered circumferentially of the bore and each having its larger end positioned for engagement with an abutment shoulder and its smaller end adjacent the larger end of the other bushing member, the bushing member in the main body forming section having longitudinally spaced rack forming teeth, a segmental pinion forming member pivotally mounted in said main section and having its teeth engaging the rack forming teeth, and a spring engaging said pinion for imparting movement to the pinion and urging the bushing in the main section towards the larger end of the bushing in the auxiliary section.

JOHN A. ANDERSON.